(12) United States Patent
Chuang et al.

(10) Patent No.: US 7,375,956 B2
(45) Date of Patent: May 20, 2008

(54) COVER POSITIONING STRUCTURE OF A DUAL-USAGE PORTABLE COMPUTER

(75) Inventors: Chin-Ku Chuang, Taipei (TW); Chin-Ming Chang, Taipei (TW); Chi-Hsuan Hung, Taipei (TW)

(73) Assignee: Tatung Co., Ltd., Taipei (TW)

( * ) Notice: Subject to any disclaimer, the term of this patent is extended or adjusted under 35 U.S.C. 154(b) by 562 days.

(21) Appl. No.: 11/152,224

(22) Filed: Jun. 15, 2005

(65) Prior Publication Data
US 2006/0198093 A1 Sep. 7, 2006

(30) Foreign Application Priority Data
Mar. 4, 2005 (TW) ............... 94106592 A

(51) Int. Cl.
*G06F 1/16* (2006.01)
(52) U.S. Cl. .................. 361/683; 345/168; 16/312; 16/367
(58) Field of Classification Search ................ 361/683
See application file for complete search history.

(56) References Cited

U.S. PATENT DOCUMENTS

| | | | | |
|---|---|---|---|---|
| 5,168,423 A | * | 12/1992 | Ohgami et al. | 361/681 |
| 5,205,017 A | * | 4/1993 | Wang | 16/367 |
| 5,335,142 A | * | 8/1994 | Anderson | 361/681 |
| 6,275,376 B1 | * | 8/2001 | Moon | 361/683 |
| 6,694,570 B2 | * | 2/2004 | Chen | 16/367 |
| 6,742,221 B2 | * | 6/2004 | Lu et al. | 16/367 |
| 6,781,819 B2 | * | 8/2004 | Yang et al. | 361/680 |
| 6,952,340 B2 | * | 10/2005 | Son et al. | 361/680 |
| 6,963,485 B2 | * | 11/2005 | Hong | 361/683 |
| 6,989,985 B2 | * | 1/2006 | Tanimoto et al. | 361/681 |
| 7,024,727 B1 | * | 4/2006 | Huang et al. | 16/354 |
| 7,047,598 B2 | * | 5/2006 | Huang | 16/312 |
| 7,123,472 B2 | * | 10/2006 | Huang et al. | 361/681 |
| 7,129,931 B2 | * | 10/2006 | Pappas | 345/168 |
| 7,159,279 B2 | * | 1/2007 | Liu et al. | 16/367 |
| 7,234,204 B2 | * | 6/2007 | Liu et al. | 16/367 |
| 7,274,561 B2 | * | 9/2007 | Takeguchi | 361/681 |
| 2004/0083577 A1 | * | 5/2004 | Lu et al. | 16/367 |
| 2005/0102799 A1 | * | 5/2005 | Huang | 16/367 |

* cited by examiner

*Primary Examiner*—Lisa Lea-Edmonds
(74) *Attorney, Agent, or Firm*—Bacon & Thomas, PLLC

(57) ABSTRACT

A cover positioning structure of a dual-usage portable computer is disclosed, which comprises a base, at least one slide block sliding on the base, at least one elastic slice imposing a pressure to the at least one slide block, and a rotary member rotated relative to the base. When rotated, a positioning protrusion of the rotary member is correspondingly positioned to a positioning recess of the at least one slide block. Therefore, the structure aforesaid not only achieves the positioning purpose of being damage-free, but also is cost-effective in having a minimum of elements and manufacture processes.

7 Claims, 5 Drawing Sheets

COVER POSITIONING STRUCTURE OF A DUAL-USAGE PORTABLE COMPUTER

BACKGROUND OF THE INVENTION

1. Field of the Invention

The present invention relates to a cover positioning structure and, more particularly, to a cover positioning structure of a dual-usage portable computer.

2. Description of Related Art

Generally, a dual-usage portable computer has a base member, and a display. The base member has a keyboard and the display pivoted to and rotated relative to the base member. When the screen of the display rotated and faced to the base member, the dual-usage portable computer functions as a notebook. When the screen of the display rotated and backs to and laid over the base member, the dual-usage portable computer functions as a tablet PC.

Referring to FIG. 1, which shows a dual-usage portable computer 9 with a base member 91, and a display 92, and the display 92 is pivoted to the base member 91 to form a notebook or a tablet PC.

After the display 92 is rotated relative to the base member 91, the display 92 must be positioned to the base member 91 to prevent the movement of the display 92. According to the traditional way, the base member 91 comprises two protruding portions 93 respectively at two opposed ends of the base member 91, and the two protruding portions 93 can be pushed toward or from the base member 91. Each of the two protruding portions 93 has a raised portion 931, and the display 92 comprises two holes 921 corresponding to the two raised portions 931 of the two protruding portions 93. Therefore, when the display 92 is rotated relative to the base member 91, the two protruding portions 93 are pushed out to let the two raised portions 931 engage with the two holes 921 respectively to limit the movement of the display 92.

However, the aforesaid traditional way requires the design of the two protruding portions 93, such that the cost of the positioning structure is increased. Further, the two protruding portions 93 must match the appearance of the base member 91, whereby the two protruding portions 93 must undergo extra manufacture processes, for example, spray painting. Further, the two protruding portions 93 will be damaged unless the user very carefully and directly rotates the display 92 when the two protruding portions 93 are engaged with the two holes 921 respectively.

Therefore, it is desirable to provide an improved cover positioning structure of a dual-usage portable computer to mitigate and/or obviate the aforementioned problems.

SUMMARY OF THE INVENTION

The present invention has been accomplished under the circumstances in view. It is therefore the main object of the present invention to provide a cover positioning structure of dual-usage portable computer, which can achieve low cost by reducing the elements and manufacture processes relative to the prior art, and can reach the position purpose in a damage-free manner. According to the present invention, a cover positioning structure of a dual-usage portable computer comprises a base, at least one slide block, at least one elastic slice, and a rotary member.

The base fixedly mounted on a base member of the dual-usage portable computer, and the base comprises a first rotary element protruded upwardly from the base, at least two blocks disposed at an outer side of the first rotary element and spaced at a predetermined distance therebetween, and at least one indentation formed between the at least two blocks. The at least one slide block slides inside the at least one indentation, and the at least one slide block comprises a positioning recess. The at least one elastic slice comprises at least one elastic arm fixedly mounted on at least one of the at least two blocks, and an operating part imposes a pressure to the at least one slide block to move the at least one slide block towards the first rotary element. The rotary member comprises a hinge pivoted to a cover of the dual-usage portable computer, a second rotary element protruded downwardly thereof and pivoted to the first rotary element and rotated relative to the base, and at least one positioning protrusion protruded from the second rotary element and corresponding positioned to the positioning recess of the at least one slide block.

When rotated, the positioning protrusion of the rotary member is correspondingly positioned to the positioning recess of the slide block. By means of the aforesaid positioning structure, which can in comparison to prior art reduce the cost by reducing the elements and manufacture processes of the structure, for example, elimination of spray painting etc, and the aforesaid positioning structure can reach the position purpose of a damage-free element, for example, the user need not exercise special care and can directly rotate the cover of the dual-usage portable computer.

DETAILED DESCRIPTION OF THE PREFERRED EMBODIMENT

Figure 1:
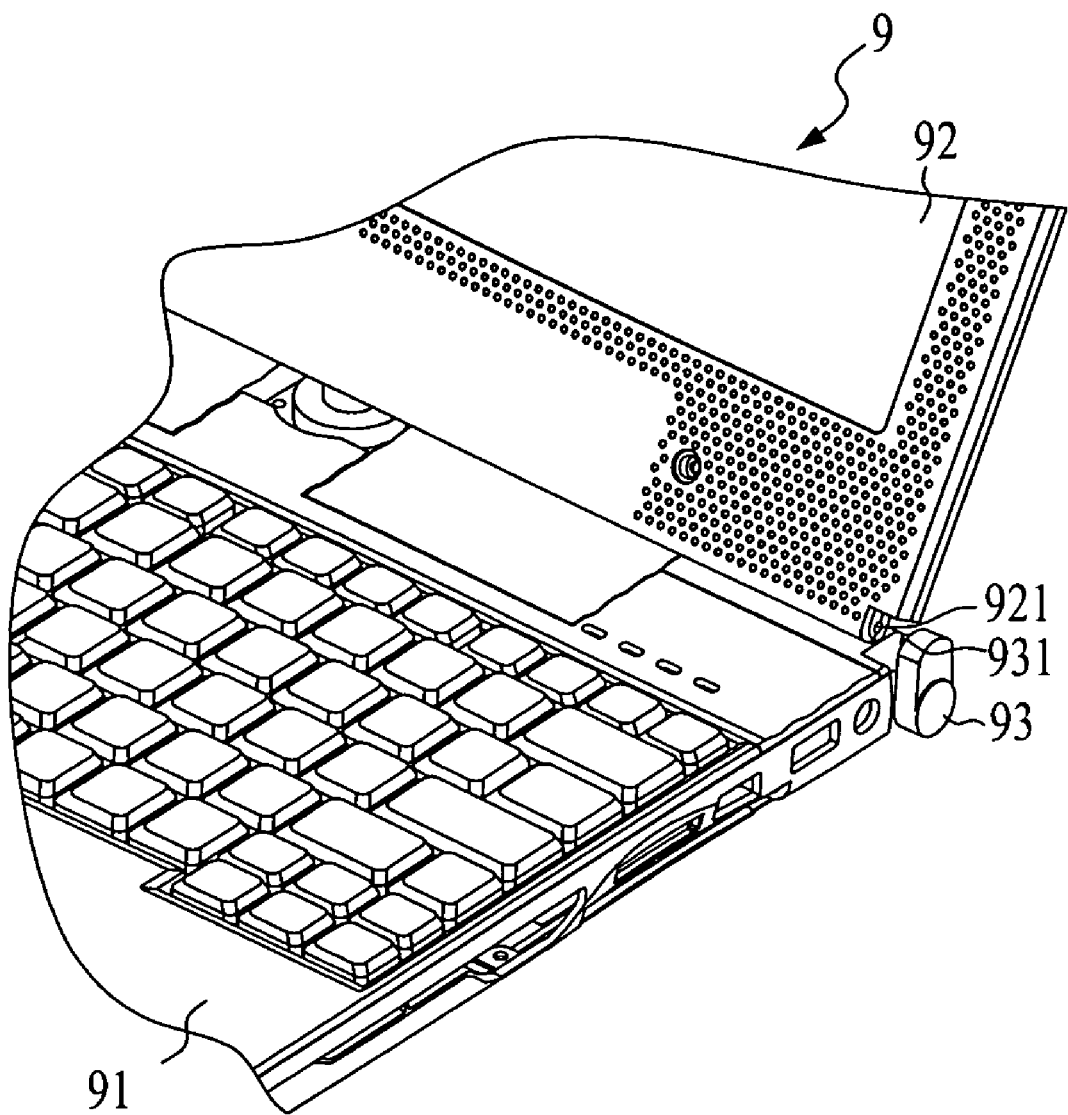
FIG. 1 is a perspective view of a dual-usage portable according to the prior art.
Figure 2:
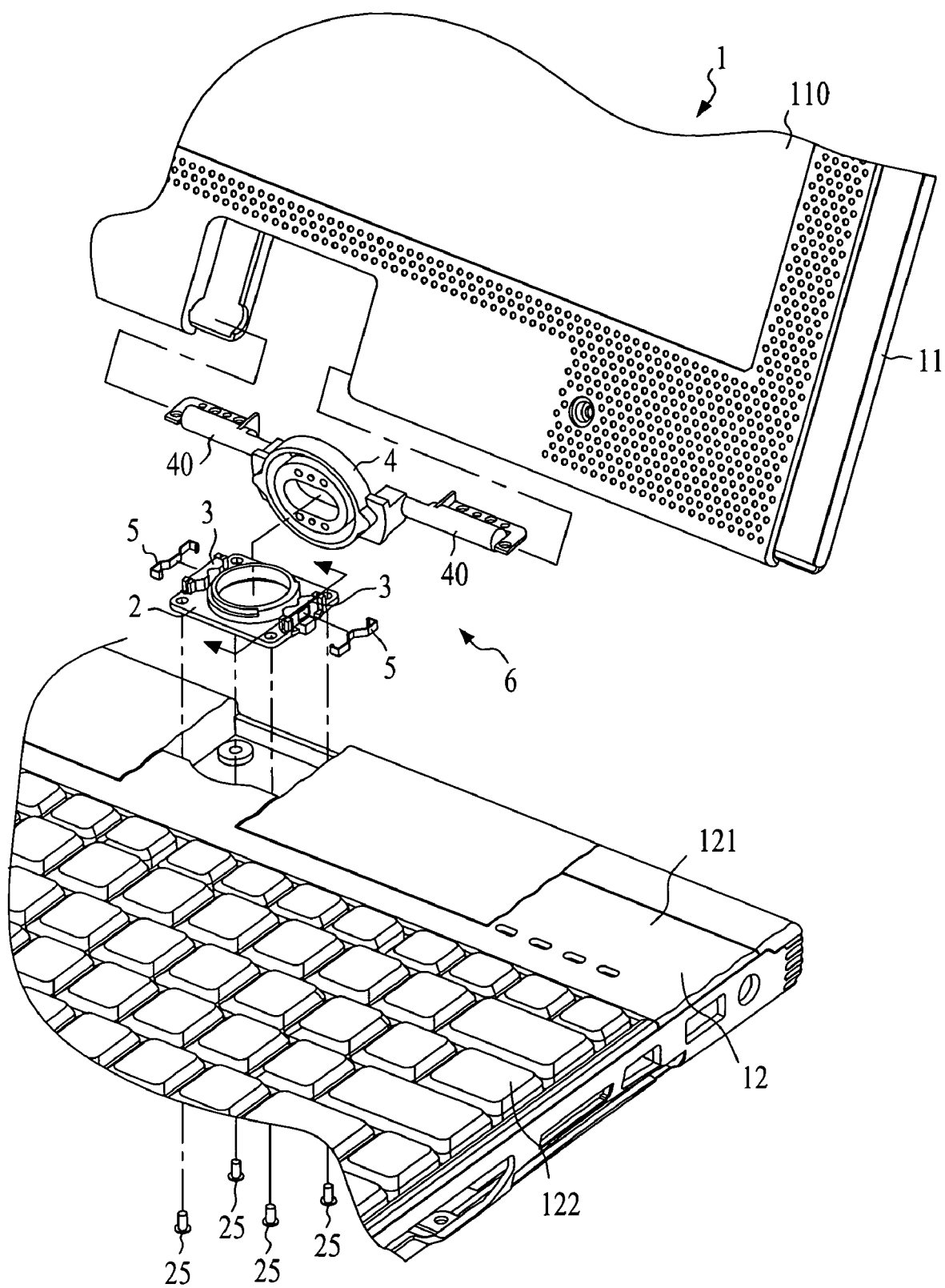
FIG. 2 illustrates the usage according to the present invention.

Referring to FIG. 2, a dual-usage portable computer 1 in accordance with the present invention comprises a cover 11 and a base member 12. The cover 11 comprises a screen 110 at one side thereof. The base member 12 comprises a top surface 121, and a keyboard 122 mounted on the top surface 121. A cover positioning structure 6 according to the present invention enables pivoting and positioning of the cover 11 to the base member 12.

Figure 3:
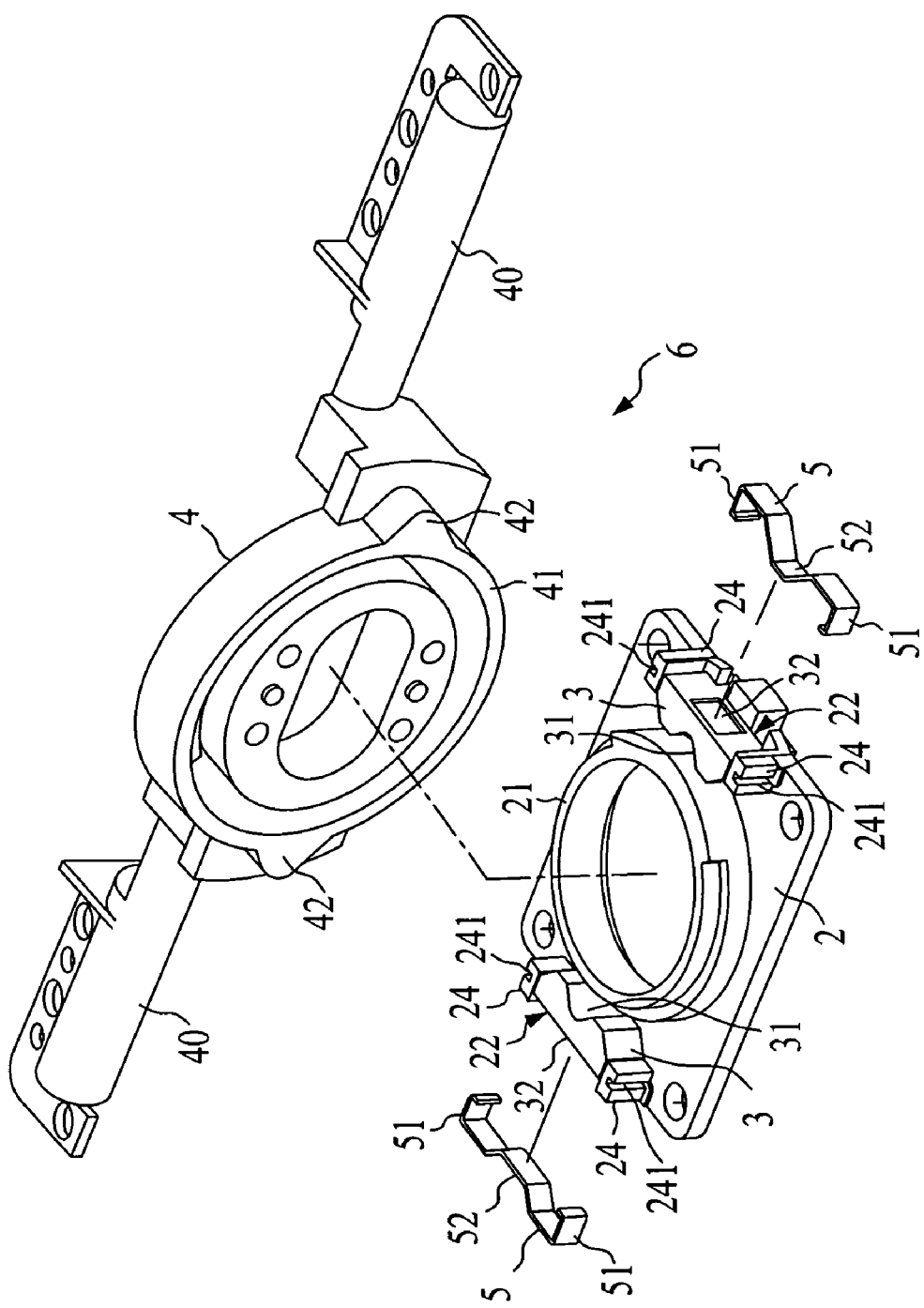
FIG. 3 is an exploded view according to the present invention.
Figure 4:
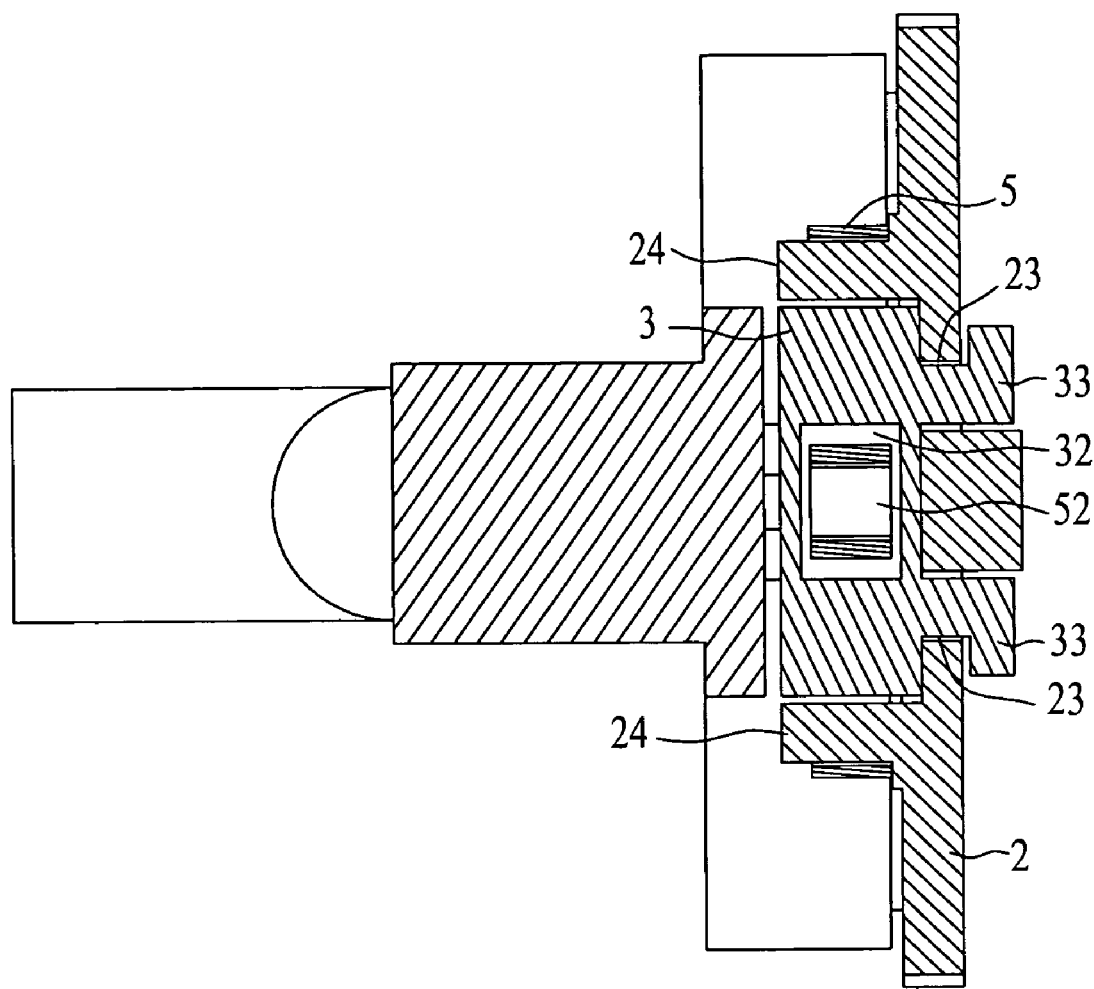
FIG. 4 is a sectional view according to the present invention.
Figure 5:
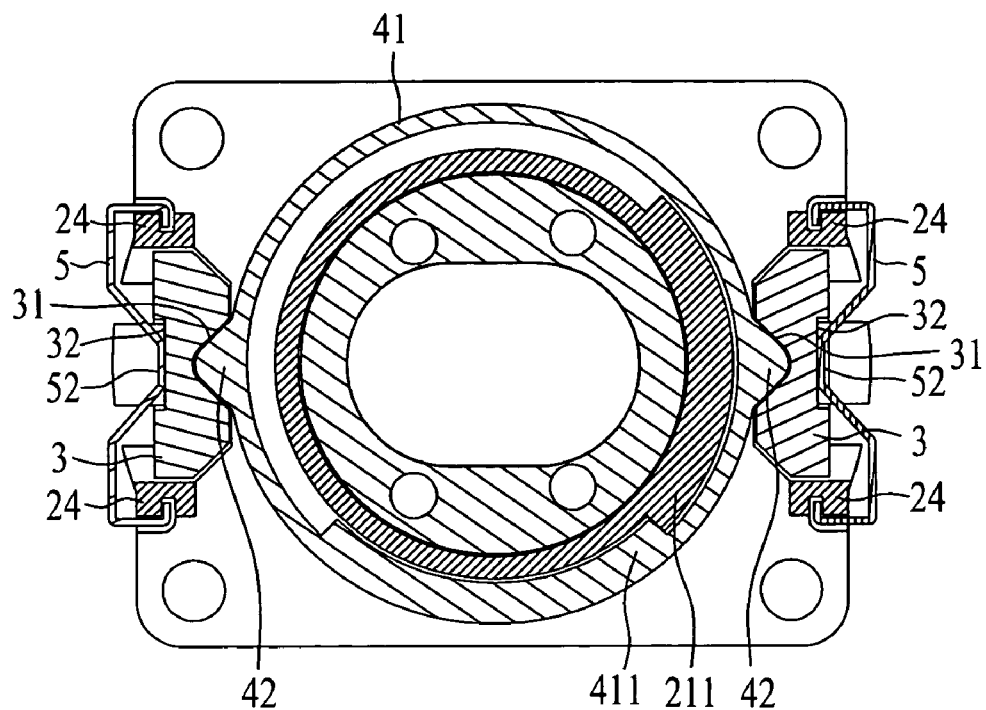
FIG. 5 is a sectional view of an action state according to the present invention (I).

Referring to FIG. 3 to FIG. 5 and FIG. 2 again, the cover positioning structure 6 comprises a base 2, two slide blocks 3, two elastic slices 5, and a rotary member 4. The base 2 is fixedly mounted on the base member 12 of the dual-usage portable computer 1. The base 2 comprises a first rotary element 21 protruded upwardly from the base 2, and four blocks 24. Two of the four blocks 24 are disposed at an outer side of the first rotary element 21, define an indentation 22 and two blind holes 23 therebetween, and the other two of the four blocks 24 are disposed at the other outer side of the first rotary element 21 and opposite to aforesaid two blocks 24, define another indentation 22 and another two blind holes 23 therebetween. Therefore, there are two indentations 22 and four blind holes 23 in total. Each of the four blocks 24 is spaced from the first rotary element 21 at a predetermined distance, and is formed as a concavity 241 at an outside thereof respectively.

According to this embodiment, the base 2 is mounted on the base member 12 of the dual-usage portable computer 1 by securing with four screws 25. The first rotary element 21 is a shaft, and the first rotary element 21 further comprises a first stop portion 211.

The two slide blocks 3 are slid inside the two indentations 22 of each two of the four blocks 24 respectively. Each of the two slide blocks 3 is protruded two insert foot 33 correspondingly inserted into the blind holes 23 respectively, and each of the two slide blocks 3 further comprises a positioning recess 31 thereon, which is faced to the first rotary element 21, and each of the two slide blocks 3 further comprises an abutting part 32 opposite to the positioning recess 31.

The two elastic slices 5 are fixedly mounted on the four blocks 24 of the base 2. Each of the two elastic slices 5 has two elastic arm 51 fixedly mounted into the concavity 241 of each of the four blocks 24 of the base 2. Each of the two elastic slices 5 further comprises an operating part 52 imposing a pressure to the abutting parts 32 of each of the two slide blocks 3 and to move the two slide blocks 3 toward the first rotary element 21.

The rotary member 4 is pivoted to the cover 11 of the dual-usage portable computer 1 by a hinge 40, and the rotary member 4 comprises a second rotary element 41 protruded downwardly thereof and pivoted to the first rotary element 21 and rotated relative to the base 2. According to this embodiment, the second rotary element 41 is a sleeve mounted onto the periphery of the shaft of the first rotary element 21 correspondingly, and the second rotary element 41 further comprises a second stop portion 411 terminating in its movement at the first stop portion 211 of the first rotary element 21 correspondingly. Further, the rotary member 4 comprises two positioning protrusions 42 protruded from the second rotary element 41 at opposite sides thereof and correspondingly positioned to the positioning recesses 31 of each of the two slide blocks 3 respectively.

Figure 6:
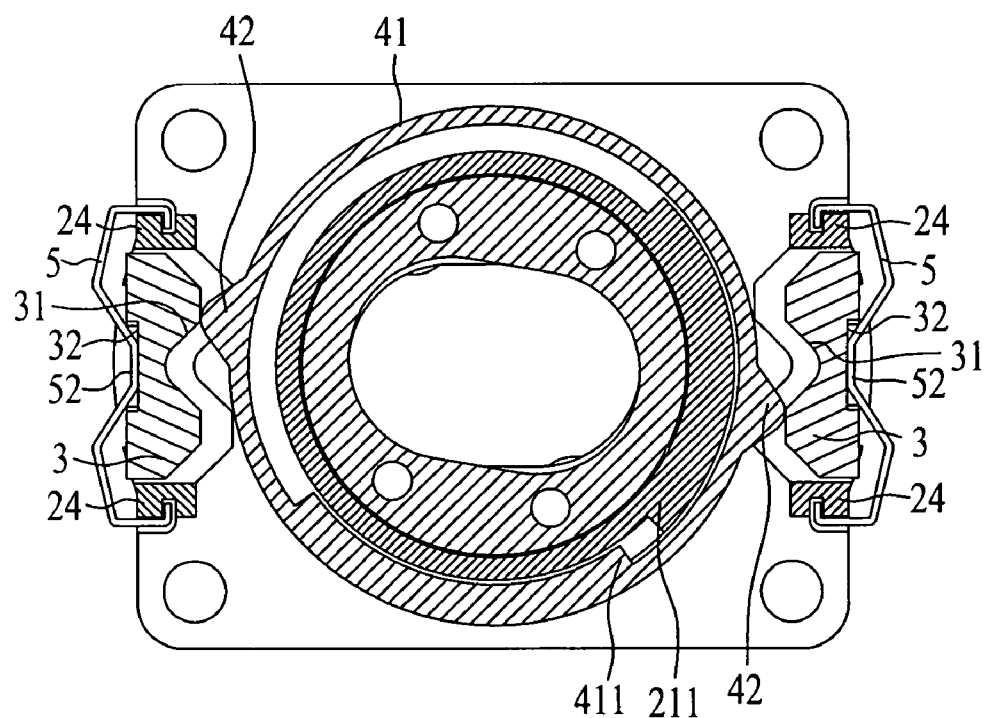
FIG. 6 is a sectional view of an action state according to the present invention (II).

Referring to FIG. 2 and FIG. 5 and FIG. 6, when a user wants to use the dual-usage portable computer 1 as a notebook computer or a tablet computer, the user can rotate the cover 11, in the meantime, the second rotary element 41 of the rotary member 4 is rotated relative to the first rotary element 21 of the base 2, and the two positioning protrusions 42 of the rotary member 4 depart from the two positioning recesses 31 of the two slide blocks 3 respectively. Each of the two positioning protrusions 42 of the rotary member 4 also pushes the two slide blocks 3 toward the outside of the base 2 respectively, as shown in FIG. 6. Then after the cover 11 of the dual-usage portable computer 1 is rotated in a way opposite to earlier described, the two positioning protrusions 42 of the rotary member 4 are engaged into the opposite sides of the two positioning recesses 31 of the two slide blocks 3 respectively, and the operating part 52 of each of the two elastic slices 5 imposes a pressure to the abutting parts 32 of each of the two slide blocks 3 to move the two slide blocks 3 toward the first rotary element 21 respectively, as shown in FIG. 5, and the second stop portion 411 of the second rotary element 41 correspondingly terminated in its movement at the first stop portion 211 of the first rotary element 21 to limit the rotation angle of the cover 11 which is rotated relative to the base 12 of the dual-usage portable computer 1. Therefore, the cover 11 can be positioned to the base 12.

By means of the aforesaid positioning structure, the present invention is cost-effective through minimizing both the quantity of elements and manufacturing processes of the positioning structure, for example, spray painting. Further, the aforesaid positioning structure of the present invention can reach the position purpose of eliminating damage previously arising when the user carelessly rotated the cover 11 of the dual-usage portable computer 1.

Although the present invention has been explained in relation to its preferred embodiment, it is to be understood that many other possible modifications and variations can be made without departing from the spirit and scope of the invention as hereinafter claimed.

What is claimed is:

1. A cover positioning structure of a dual-usage portable computer comprising:

a base, fixedly mounted on a base member of said dual-usage portable computer, said base comprising a first rotary element protruded upwardly from said base, at least two blocks disposed at an outer side of said first rotary element and spaced at a predetermined distance therebetween, and at least one indentation formed between said at least two blocks;

at least one slide block sliding inside said at least one indentation, said at least one slide block comprising a positioning recess;

at least one elastic slice comprising at least one elastic arm fixedly mounted on at least one of said at least two blocks, and an operating part imposing a pressure to said at least one slide block to move said at least one slide block towards said first rotary element; and a rotary member comprising a hinge pivoted to a cover of said dual-usage portable computer, a second rotary element protruded downwardly thereof and pivoted to said first rotary element and rotated relative to said base, and at least one positioning protrusion protruded from said second rotary element and corresponding positioned to the positioning recess of said at least one slide block.

2. The cover positioning structure of a dual-usage portable computer as claimed in claim 1, wherein said base further comprising at least one blind hole between said at least two blocks, said at least one slide block further comprising at least one insert foot correspondingly inserted into said at least one blind hole.

3. The cover positioning structure of a dual-usage portable computer as claimed in claim 1, wherein at least one of said at least two blocks comprising a concavity at an outside thereof, the at least one elastic arm of said at least one elastic slice fixedly mounted into said concavity correspondingly.

4. The cover positioning structure of a dual-usage portable computer as claimed in claim 1, wherein said first rotary element is a shaft, said second rotary element is a sleeve mounted onto the periphery of said shaft correspondingly.

5. The cover positioning structure of a dual-usage portable computer as claimed in claim 1, wherein said first rotary element further comprises at least one first stop portion, said second rotary element further comprises at least one second stop portion terminating in its movement at said at least one first stop portion correspondingly.

6. The cover positioning structure of a dual-usage portable computer as claimed in claim 1, wherein said base is mounted on said base member by securing with a plurality of screws.

7. The cover positioning structure of a dual-usage portable computer as claimed in claim 1, wherein said base comprises a top surface, and a keyboard mounted on said top surface.

* * * * *